United States Patent Office 3,284,478
Patented Nov. 8, 1966

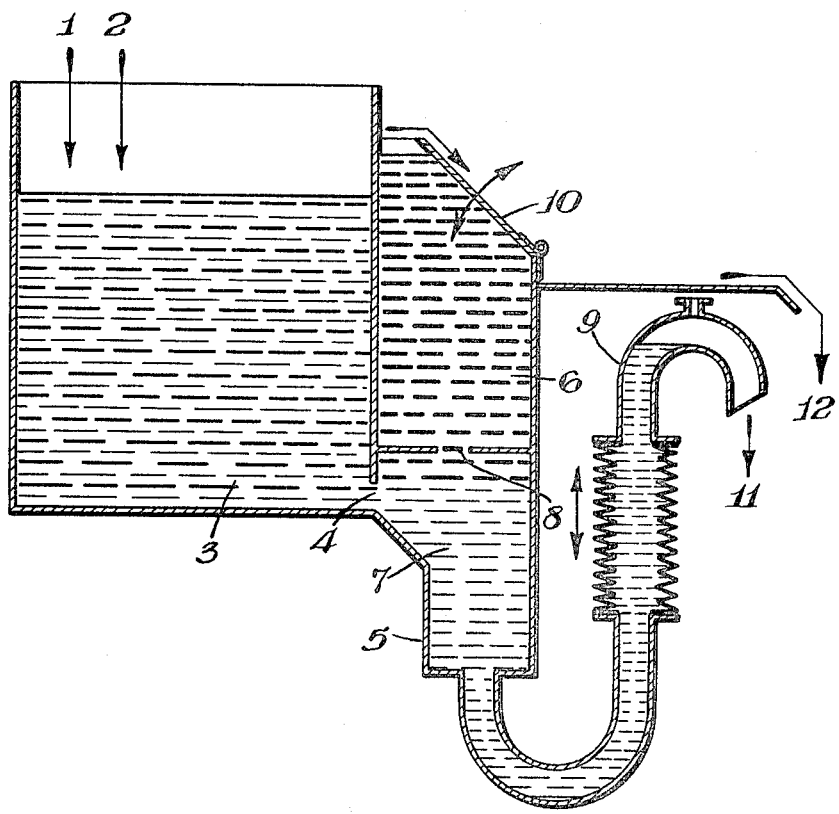

3,284,478
PROCESS FOR THE OXIDATIVE BLEACHING OF ESTER WAXES
Robert Schirmer, Aystetten, near Augsburg, Ludwig Jürgen-Lohmann and Heinrich Voit, Augsburg, and Friedrich Zinnert, Gersthofen, near Augsburg, Germany, assignors to Farbwerke Hoechst Aktiengesellschaft vormals Meister Lucius & Bruning, Frankfurt am Main, Germany, a corporation of Germany
Filed July 2, 1963, Ser. No. 292,425
Claims priority, application Germany, July 6, 1962, F 37,244
8 Claims. (Cl. 260—423)

The present invention relates to a process for the oxidative bleaching of waxes.

It has been known to bleach ester waxes oxidatively by means of chromosulfuric acid. In this bleaching process the wax is reacted with the acid in two reaction stages.

In the first stage particularly the dark coloured products and the resins are oxidized to carbon dioxide. This reaction can be controlled only with difficulty for the following reasons: First, there is formed, with increase in volume, a phase consisting of wax, chromosulfuric acid and $CO_2$. This phase releases the acid only after it has reacted to a great extent. Second, in this stage the wax-acid mixture has a tendency to foaming. Third, when the process is carried out on an industrial scale, the reaction heat can cause local overheatings and thus disturbances.

In the second reaction stage the wax alcohols formed by decomposition of the esters are preferably oxidized to wax acids. In this step the wax phase and the acid aqueous phase separate undesiredly rapidly because of the difference as to their densities, as far as their separation is not delayed or prevented by turbulently mixing these substances. However, the interface between wax phase and acid aqueous phase is relatively small, even if the substances are turbulently mixed, so that a relatively long time is necessary for carrying out the desired bleaching reaction.

Now, a process has been found for the oxidative bleaching of ester waxes, particularly of montan waxes, by treating them with aqueous chromosulfuric acid, in which the wax is emulsified by adding chromosulfuric acid in portions, and/or by using the chromosulfuric acid in the reaction space in portions, in such a quantity that in the reaction space the proportion by volume of the wax phase to the acid aqueous phase is 1:X, X which stands for the volume of acid aqueous phase being inferior or equal to 3, the emulsion is broken after having attained the desired $CrO_3$ concentration, the acid aqueous phase is separated from the wax phase after their disintegration, and this treatment of the wax is preferably repeated several times advantageously with freshly prepared chromosulfuric acid.

The process according to the invention is of particular advantage in the second reaction stage of the oxidative bleaching, i.e. for oxidizing the wax alcohols obtained from the wax esters, but it also promotes the first reaction stage. Since in the first reaction stage the wax combines, as mentioned above, with the acid added to form a phase, and since it separates from the acid only after this reaction stage is finished, there is meant by wax phase in the first reaction stage the phase containing the wax.

The main point of the present invention is, at the one hand, to keep the level of the aqueous chromosulfuric acid separated from the wax relatively low in the reaction space, to reduce as rapidly as possible the $CrO_3$ added of the freshly prepared chromosulfuric acid, to remove the acid aqueous phase used and to repeat this procedure in a discontinuous or continuous working manner so many times as is necessary to obtain the desired degree of bleaching and/or a final product having the desired properties. (By "level" is meant the height of the aqueous phase after cancellation of the emulsifying conditions in the reaction space, i.e. the height of the aqueous phase must be relatively low with respect to the corresponding conditions in known processes compared with the height of the wax phase.) On the other hand, the present invention provides a process which tends to keep the average $CrO_3$ concentration in the reaction space as low as possible. This concentration preferably amounts to less than 30 g. and more particularly to less than 15 g. of $CrO_3$ per liter of acid aqueous solution. The chromosulfuric acid used generally contains 450–600 g. per liter of sulfuric acid. There can, however, also be used higher or lower concentrations.

The chromosulfuric acid can be reacted particularly rapidly and completely with the wax, if it is finely divided in it. This can be achieved mechanically, for example by stirring, or with particular advantage by atomizing the acid by means of suitable devices, for example by nozzles. However, the phases can also be intimately mixed by providing turbulent conditions by boiling, by blowing in steam or inert gases, for example nitrogen, or by other modes of action, and by emulsifying the acid-wax mixture in a manner such that a particularly great interface between the wax phase and the aqueous phase is formed.

On the one hand, the proportions by volume of the reactants in the reaction space depend on the proportions by volume of the quantity of the reactants introduced within the unit of time. On the other hand, the proportions by volume also depend on the altitude of the interface between the wax phase and the acid aqueous phase in a quiescent and separation zone, in which the emulsifying conditions are invalidated, and which communicates with the reaction space. The content of the emulsion of acid aqueous phase increases with the diminishing distance from this interface to the surface of the liquid in the reaction space, and the more wax phase contained in the emulsion the lower this interface is situated in comparison with the inferior boundary surface of the reaction space. The position of the interface is regulated by elevation adjustment of the acid outlet syphon.

According to the efficacy of the emulsifying conditions in the reaction space the emulsion formed is more or less stable, and correspondingly the residence time of the acid aqueous phase is longer or shorter at the same level of the emulsion in the reaction space, i.e. the influence exercised by the proportions by volume of the reactants before being introduced into the reaction space, on the proportions by volume of the reactants in the reaction space are rather independant of the altitude of the interface.

The proportions by volume of the wax phase and of the acid aqueous phase 1:X to be maintained in the reaction space according to the invention, in which X is inferior or equal to 3 and advantageously not smaller than 0.1, can be obtained by adjusting the inlet of the reactants into the reaction space and/or their outlet from the reaction space.

It is of particular advantage to maintain the proportions of the phases in the reaction space by force, by using overflows placed behind the reaction space and separated for both phases. As to the wax phase, a weir at the quiescent and separation zone communicating with the reaction space can be used for this purpose, while the acid phase is advantageously lead off from this quiescent and separation zone by a siphon. A possible technical mode of carrying out the process is illustrated by the accompanying drawing:

Wax and freshly prepared chromosulfuric acid are introduced at 1 and 2 respectively into the reaction space 3, in which, for example by boiling of the mixture, emulsifying conditions are maintained. The reaction space 3 is connected with the quiescent and separation zone 5 by opening 4. In the quiescent and separation zone 5 the emulsifying conditions are invalidated. Thus the emulsion breaks, the wax creams up, the acid aqueous phase settles. Between the wax base 6 and the acid aqueous phase 7 the interface 8 is formed.

Siphon 9 which can be regulated by means of elevation adjustment of the overflow serves as outlet for the acid, and weir 10, also adjustable as to the elevation, as overflow for the wax. The acid exhausted is discharged at 11, the wax at 12.

When a desired bleaching degree is obtained or when the $CrO_3$ used is exhausted to a great extent or completely, what can be checked by known analytical methods, the emulsion is broken by finishing the turbulent state. The phases dissociate. The aqueous phase is separated from the wax phase. It is desirable, in order to carry out the process economically that the aqueous phase only contains very small quantities of $CrO_3$, for example less than 3 g. per liter. If the content of $CrO_3$ still is considerably higher, the aqueous phase is advantageously used again for the bleaching of wax.

Under the conditions mentioned above in most cases a unique treatment of wax with the aqueous chromosulfuric acid is not sufficient to obtain the desired bleaching degree. In this case the bleaching is repeated several times, for example 1, 2 or 3 times with freshly prepared chromosulfuric acid.

Ester waxes suitable for the oxidative bleaching according to the present invention are, for example carnauba waxes, ouricury, esparto and shellac waxes. Montan wax is particularly suitable.

In comparison with the known processes for the bleaching waxes with chromosulfuric acid and in view of the quantitative proportions of the wax and the chromosulfuric acid, and the maximum average $CrO_3$ concentration to be advantageously maintained in the reaction space, the present invention provides the following advantages:

(1) From the quantity of crude wax used there can be obtained a great amount of oxidation product, since less wax substance is oxidatively decomposed, because of the shorter reaction time and the lower average $CrO_3$ concentration.

(2) There is obtained an oxidation product having a higher acid number and a brighter colour with the same quantity of chromosulfuric acid.

(3) The properties of the oxidation product are exactly reproducible.

(4) The space-time-yield is particularly good.

(5) The disadvantages of the hitherto known processes described above, even those occurring in the first reaction stage, are substantially avoided.

The following example serves to illustrate the invention, but it is not intended to limit it thereto:

*Example*

(a) In half an hour's interval and at the boiling temperature of the mixture 4 times 200 l. of chromosulfuric acid (100 g. of $CrO_3$ and 530 g. of $H_2SO_4$ per l.) were added to 100 kg. of deresinified crude montan wax, the resin content of which had been reduced to 9% by weight and the mixture was thoroughly stirred. After altogether 2 hours the first reaction stage was finished. Now the temperature was reduced to close below the boiling point, and the mixture was allowed to separate within one hour. Then the exhausted aqueous phase was discharged.

After the exhausted aqueous phase had been separated, the 2nd reaction stage set in. In 1.5 hour's interval 2 times 100 l. of chromosulfuric acid of the above concentration were added to the wax obtained from the 1st reaction stage. The temperature was increased to violently boiling. After altogether 3 hours the temperature was again reduced to close below the boiling temperature and the mixture was allowed to separate during 1 hour. Then the exhausted aqueous phase was withdrawn and the process as carried out in the 2nd reaction stage was repeated 2 times.

The bleached wax thus obtained was washed free from electrolytes according to one of the known processes, for example with diluted sulfuric acid and water. It had a bright yellow colour and an acid number of 150–155. The yield amounted to 89 kg., corresponding to a yield of more than 98%, calculated on the wax substance free from resin contained in the product used.

(b) The crude montan wax to be bleached containing still 9% by weight of resin was continuously passed through 10 reaction spaces and in each it was subjected to a treatment with chromosulfuric acid, i.e. in every reaction space there was introduced freshly prepared chromosulfuric acid (100 g. of $CrO_3$ and 530 g. of $H_2SO_4$ per l.) and from every second reaction space there was discharged exhausted acid (0–3 g. of $CrO_3$ per l.) in a manner such as is illustrated by the accompanying drawing. In the reaction spaces turbulent boiling conditions were maintained. The reaction temperatures varied within the range of from 116 to 119° C. The wax and the acid separated by the cancellation of the boiling turbulence in the quiescent and separation zones, placed behind the corresponding reaction spaces and communicating with them.

The following table illustrates the amount in percent by weight of $CrO_3$ contained in the freshly prepared chromosulfuric acid and calculated on the crude montan wax used, (133.4% by weight on the whole) introduced into the individual reaction spaces, and the proportions by volume of the wax phase and the acid aqueous phase (1:X) in these reaction spaces.

| Reaction space | I | II | III | IV | V | VI | VII | VIII | IX | X |
|---|---|---|---|---|---|---|---|---|---|---|
| $CrO_3$ added, in percent by weight, calculated on the crude montan wax used | 35.5 | 42.4 | 12.4 | 7.3 | 7.7 | 5.0 | 6.8 | 5.0 | 6.4 | 4.9 |
| Corresponding proportion by volume of the reactants in the reaction space (1:X) | 1:2.67 | 1:1.28 | 1:1.19 | 1:1.95 | 1:0.44 | 1:1.38 | 1:0.52 | 1:1.24 | 1:0.61 | 1:0.95 |

The wax thus obtained was aftertreated as described under (a) however, while passing through the reaction spaces continuously. As under (a) there was obtained a final product of bright colour having an acid number of 150–155. The yield of wax amounted to 99% by weight.

We claim:

1. In the process for the oxidative bleaching of ester waxes by treating them with chromosulfuric acid the steps which comprise emulsifying the ester wax and the chromosulfuric acid in a ratio such that the proportion by volume of the wax phase to the acid aqueous phase is 1:X, in which proportion by volume of acid aqueous phase X is at most equal to 3, the average $CrO_3$ concentration in the reaction space not exceeding 30 g. per liter of the acid aqueous solution used, breaking the emulsion, and separating the acid aqueous phase from the wax phase after their disintegration.

2. The process of claim 1, wherein the ratio of wax phase to acid aqueous phase in the reaction space is produced by adjusting the altitude of the interface between these phases in a quiescent zone following the reaction space and with which the reaction space is in communication.

3. The process of claim 2, wherein the interface between the two phases in the quiescent zone is at a higher level than the lower end of the reaction space.

4. The process of claim 1, wherein the chromosulfuric acid is added in portions to the ester wax phase.

5. The process of claim 1, wherein montan wax is used as ester wax.

6. The process of claim 1, wherein the $CrO_3$ concentration does not exceed 15 g. per liter.

7. The process of claim 1, wherein the aqueous chromosulfuric acid is mixed with the wax phase by spraying the acid thereinto.

8. The process of claim 1, wherein the treatment of the ester wax is repeated several times each time with freshly prepared chromosulfuric acid.

References Cited by the Examiner
UNITED STATES PATENTS

| | | | |
|---|---|---|---|
| 1,767,886 | 6/1930 | Hellthaler | 260—423 |
| 1,777,766 | 10/1930 | Pungs et al. | 260—423 |

CHARLES B. PARKER, *Primary Examiner.*

ANTON H. SUTTO, *Assistant Examiner.*